(12) United States Patent
Wilson et al.

(10) Patent No.: US 11,128,132 B2
(45) Date of Patent: Sep. 21, 2021

(54) CURRENT BALANCING

(71) Applicant: Hamilton Sundstrand Corporation, Charlotte, NC (US)

(72) Inventors: Michael A. Wilson, Scottsdale, AZ (US); Steven A. Avritch, Bristol, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/800,305

(22) Filed: Feb. 25, 2020

(65) Prior Publication Data
US 2021/0265836 A1    Aug. 26, 2021

(51) Int. Cl.
*H02J 1/10* (2006.01)
*G05F 1/575* (2006.01)

(52) U.S. Cl.
CPC ............. *H02J 1/102* (2013.01); *G05F 1/575* (2013.01); *H02J 1/106* (2020.01); *H02J 1/108* (2013.01)

(58) Field of Classification Search
CPC .... H02J 1/10; H02J 1/102; H02J 1/106; H02J 2310/44; G05F 1/59; G05F 1/575; G05F 1/565
See application file for complete search history.

(56) References Cited

U.S. PATENT DOCUMENTS

| | | | |
|---|---|---|---|
| 4,618,779 A | 10/1986 | Wiscombe | |
| 6,177,783 B1 * | 1/2001 | Donohue | H02J 1/001 323/272 |
| 7,282,899 B1 | 10/2007 | Daun-Lindberg et al. | |
| 7,355,829 B2 * | 4/2008 | Yamamura | H02J 1/10 361/91.1 |
| 7,466,573 B2 * | 12/2008 | Kojori | H03K 17/6872 363/65 |
| 8,022,654 B2 * | 9/2011 | Zhao | H02P 1/04 318/526 |
| 8,853,885 B2 | 10/2014 | Umminger et al. | |
| 9,413,170 B2 | 8/2016 | Henkel et al. | |
| 9,705,325 B2 | 7/2017 | Dwelley | |
| 10,476,266 B2 | 11/2019 | Gurlahosur et al. | |
| 2005/0078424 A1 | 4/2005 | Yamamura et al. | |
| 2010/0164289 A1 | 7/2010 | Umminger et al. | |
| 2011/0175585 A1 | 7/2011 | Huang et al. | |

OTHER PUBLICATIONS

Extended European Search Report dated May 21, 2021, issued during the prosecution of European Patent Application No. EP 21159177.1.

* cited by examiner

*Primary Examiner* — Ryan Johnson
(74) *Attorney, Agent, or Firm* — Locke Lord LLP; Joshua L. Jones; Scott D. Wofsy

(57) ABSTRACT

A system includes a first input line for a first voltage source, wherein the first input line is connected to a first output. A second input line is included for a second voltage source, wherein the second input line is connected to a second output and is in parallel with the first input line. A first series pass element is connected in series with the first input line, and a second series pass element is connected in series with the second input line. A controller is operatively connected to the first series pass element and to the second series pass element to throttle at least one of the first series pass element and the second series pass element to balance output current in the first and second outputs.

19 Claims, 3 Drawing Sheets

CURRENT BALANCING

BACKGROUND

1. Field

The present disclosure relates to power supplies, and more particularly to direct current power supplies such as 28 Volt direct current (VDC) power supplies for safety sensitive aerospace avionics applications.

2. Description of Related Art

Many avionics controls require multiple 28 VDC voltage inputs for redundancy. The redundant voltage inputs are typically "OR-ed" together (using diodes or an active-circuit equivalent) to allow the system to function in the event that one of the voltage inputs is unavailable. Under certain circumstances, input current can be drawn solely from a single one of the voltage inputs even when both are available. Specifically, when multiple power sources are utilized to power an avionics application, the power sources are not regulated to the exact same voltage level. Even slight differences in voltage between two redundant voltage sources can result in a large imbalance of current where the vast majority of current is drawn from the source with the higher voltage. This has the effect of driving an increase in the requirement for the maximum current capabilities of the 28 VDC voltage supplies and harness wiring, since equal distribution of current cannot be guaranteed.

The conventional techniques have been considered satisfactory for their intended purpose. However, there is an ever present need for improved systems and methods for power supplies such as for avionics. This disclosure provides a solution for this need.

SUMMARY

A system includes a first input line for a first voltage source, wherein the first input line is connected to a first output. A second input line is included for a second voltage source, wherein the second input line is connected to a second output and is in parallel with the first input line. A first series pass element is connected in series with the first input line, and a second series pass element is connected in series with the second input line. A controller is operatively connected to the first series pass element and to the second series pass element to throttle at least one of the first series pass element and the second series pass element to balance output current in the first and second outputs.

A first current sensor can be connected in series in the first line between the first series pass element and the first output, wherein the first current sensor is operatively connected to the controller to provide feedback to the controller regarding current in the first line. A second current sensor can be connected in series in the second line between the second series pass element and the second output, wherein the second current sensor is operatively connected to the controller to provide feedback to the controller regarding current in the second line. A difference amplifier can be connected to receive input from each of the first and second current sensors, and can be connected to provide output to the controller proportional to difference in current between the first and second current sensors.

A difference amplifier can connect between the controller and the first series pass element for controlling the first series pass element. The difference amplifier can be connected to a bias voltage so the difference amplifier can compare between output of the controller and the bias voltage to control the first series pass element. A summing amplifier can connect between the controller and the second series pass element for controlling the second series pass element. The summing amplifier can be connected to a bias voltage so the summing amplifier can compare between output of the controller and the bias voltage to control the second series pass element.

A diode or-ing can be operatively connected to each of the first and second outputs and configured to output a single voltage from the first and second lines. The diode or-ing can include a respective Schottky diode connected to each of the first and second outputs. Each of the first and second series pass elements can include a respective p-channel MOSFET as a primary pass element. The controller can be a proportional integral (PI) controller.

A method includes balancing output current between a first input line and a second input line. Balancing output current includes throttling current in at least one of a first series pass element and second series pass element connected series with the first input line and the second input line, respectively. Balancing output current can be performed within a response time configured to avoid tripping a breaker. The method can include maintaining the output current at 28 VDC.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
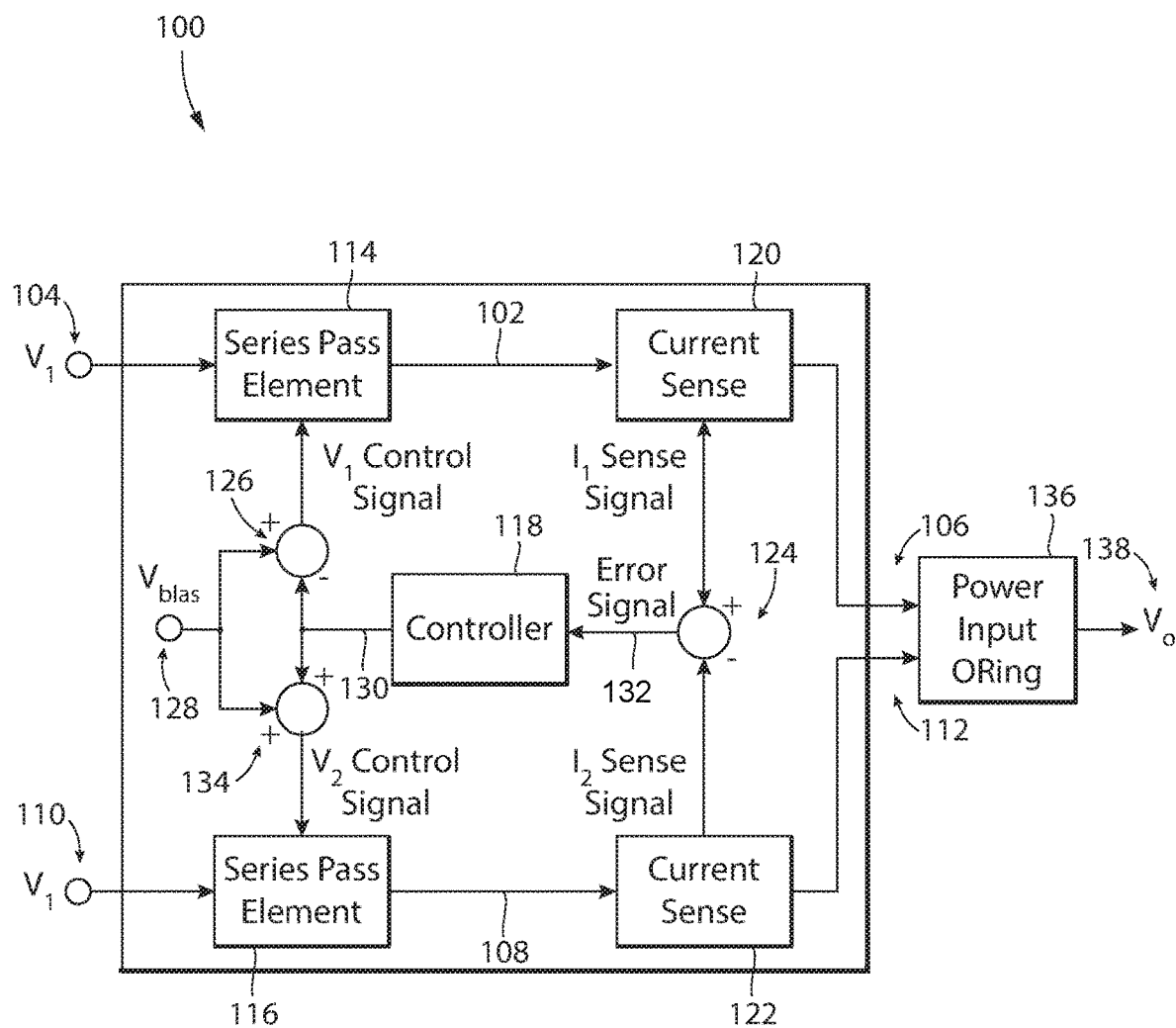
FIG. 1 is a schematic view of an embodiment of a system constructed in accordance with the present disclosure, showing the first and second lines.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used for current balancing, e.g. where multiple redundant 28 VDC voltage sources are used in avionics applications.

A system 100 includes a first input line 102 for connecting to a first voltage source 104, The first input line 102 is connected to a first output 106. A second input line 108 is included for connecting to a second voltage source 110. The second input line 108 is connected to a second output 112 and is in parallel with the first input line 102. A first series pass element 114 is connected in series with the first input line 102, and a second series pass element 116 is connected in series with the second input line 108. A controller 118 is operatively connected to the first series pass element 114 and to the second series pass element 116 to throttle the first series pass element 114 and/or the second series pass element 116 to balance output current in the first and second outputs 106, 112.

A first current sensor 120 is connected in series in the first line 102 between the first series pass element 114 and the first output 106. The first current sensor 120 is operatively connected to the controller 118 to provide feedback to the controller 118 regarding current in the first line 102. A second current sensor 122 is connected in series in the second line 108 between the second series pass 116 element and the second output 112. The second current sensor 122 is operatively connected to the controller 118 to provide feedback to the controller regarding current in the second line 108. A difference amplifier 124 is connected to receive input from each of the first and second current sensors 120, 122, and can be connected to provide output as an error signal to the input line 132 of the controller 118 proportional to difference in current between the first and second current sensors 120, 122.

A difference amplifier 126 connects between the output 130 of the controller 118 and the first series pass element 114 for controlling the first series pass element 114. The difference amplifier 126 is connected to a bias voltage 128 so the difference amplifier 126 can compare between output of the controller 118 and the bias voltage 128 to control the first series pass element 114. The purpose of the bias voltage is to ensure that at least one of the series pass elements remains turned on, i.e. not throttled. This is to avoid the degenerate case where both currents are balanced, e.g., at zero. A summing amplifier 134 connects between the controller 118 and the second series pass element 116 for controlling the second series pass element 116. The summing amplifier 134 is connected to the bias voltage 128 so the summing amplifier 134 can compare between output of the controller 118 and the bias voltage 128 to control the second series pass element 116.

Figure 2:
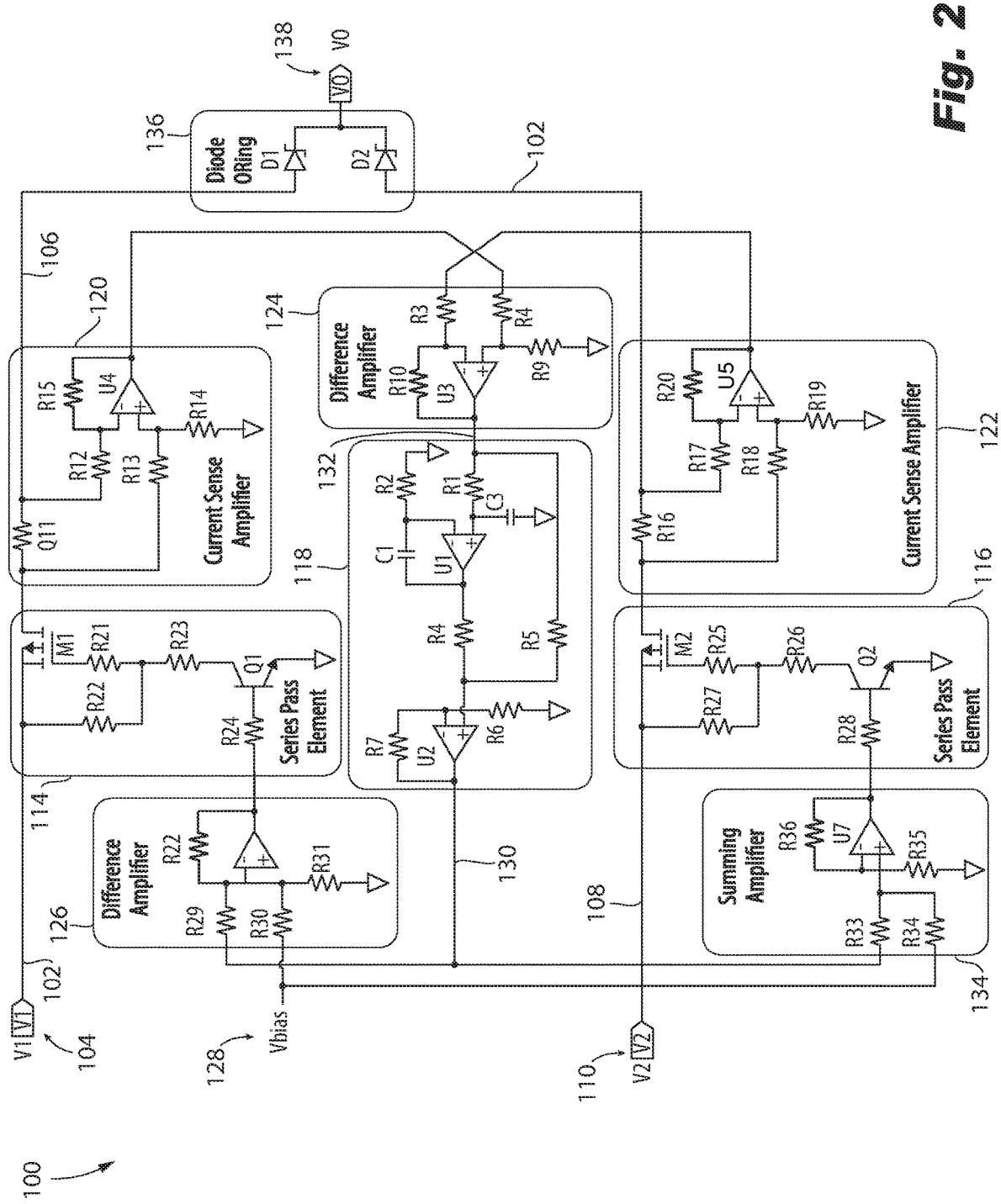
FIG. 2 is a schematic view of the system of FIG. 1, showing the circuit elements of individual components from FIG. 1.

With reference now to FIG. 2, a diode or-ing 136 is operatively connected to each of the first and second outputs 106, 112 and is configured to output a single voltage 138 from the first and second lines 102, 108. The diode or-ing 136 includes a respective Schottky diode D1, D2 connected to each of the first and second outputs 106, 112, and to the single output voltage 138. Those skilled in the art will readily appreciate that any other suitable type of diode isolation can be implemented without departing from the scope of this disclosure such as a diode isolation function that could be implemented with actual diodes, ideal diode circuitry, similar circuitry that implements the isolation function of a simple diode, or the like.

Each of the first and second series pass elements 114, 116 includes a respective p-channel MOSFET M1, M2 as the primary pass element for throttling current in the respective line 102, 108. Each of the first and second series pass elements 114, 116 includes a respective set of resistors R21, R22, R23 and R25, R26, R27, and respective grounded transistor Q1, Q2 connected as shown in FIG. 2. Those skilled in the art will readily appreciate that there are other discrete circuit instantiations that can perform the same functions as the elements of the first and second series pass elements 114, 116 described above without departing from the scope of the invention.

Each of the difference amplifiers, 124, 126 includes respective resistors R3, R8, R9, R10, and R29, R30, R31, R32 and a respective operational amplifier (op-amp) U3, U6 connected as shown in FIG. 2, including grounding connections. The summing amplifier 134 includes resistors R33, R34, R35, R36 and an operational amplifier U7 connected as shown in FIG. 2, including the grounding connection. Each of the current sensors 120, 122 can be a current sense amplifier, including the respective resistors R11, R12, R13, R14, R15 and R16, R17, R18, R19, R20 and the respective op-amps U4 and U5 connected as shown in FIG. 2, including the grounding connections. The controller 118 can be a proportional integral (PI) controller, including the resistors R1, R2, R4, R5, R6, R7, the capacitors C1 and C3, the op-amp U1, and the grounding connections as shown in FIG. 2.

Figure 3:
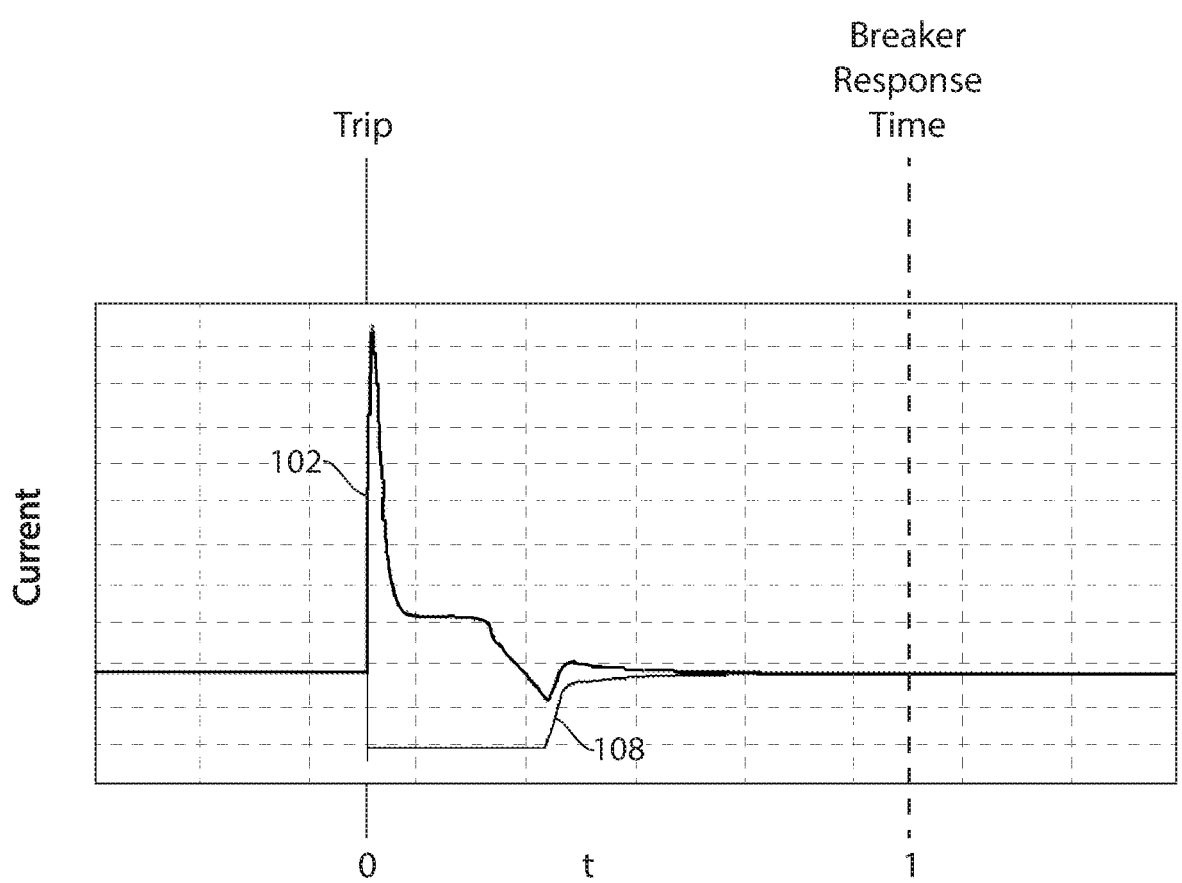
FIG. 3 is an example of a time response plot of the system of FIG. 1, showing response to a step change in one voltage source.

A method includes balancing output current between a first input line (e.g. line 102) and a second input line (e.g., line 108). Balancing output current includes throttling current in at least one of a first series pass element (e.g. series pass element 114) and second series pass element (e.g. series pass element 116) connected in series with the first input line and the second input line, respectively. This method is capable of balancing current for typical 28 VDC avionics applications or any other voltage suitable for other avionics applications (e.g. 12 VDC applications as well as others). As shown in FIG. 3, balancing output current can be performed within a response time configured to avoid tripping a breaker, i.e. after a step event (the event at the time labeled "Trip" in FIG. 3), the current in the first and second lines 102, 108 is re-balanced before the time when the associated breaker would trip (the time labeled "Breaker Response Time" in FIG. 3).

Additional practical considerations can be aimed at limiting the maximum power dissipation in the series pass elements 114, 116. This could take a number of forms, including but not limited to:

1) measuring the voltage differential between the two voltage sources 104, 110 and locking out operation of the circuitry when said differential exceeds a certain threshold;

2) measuring the minimum voltage of the two voltage sources 104, 110 and locking out operation of the circuitry when said voltage drops below a certain threshold; and 3) measuring the die or package temperature of the series pass elements 114, 116 and locking out operation of the circuitry when said temperature exceeds a certain threshold.

The methods and systems of the present disclosure, as described above and shown in the drawings, provide for automatic current balancing, e.g. for 28 VDC avionics applications. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
 a first input line for a first voltage source, wherein the first input line is connected to a first output;
 a second input line for a second voltage source, wherein the second input line is connected to a second output and is in parallel with the first input line;
 a first series pass element connected in series with the first input line;

a second series pass element connected in series with the second input line; and a controller operatively connected to the first series pass element and to the second series pass element to throttle at least one of the first series pass element and the second series pass element to balance output current in the first and second outputs, further comprising a second current sensor connected in series in the second line between the second series pass element and the second output, wherein the second current sensor is operatively connected to the controller to provide feedback to the controller regarding current in the second line, further comprising a difference amplifier connected to receive input from each of the first and second current sensors, and connected to provide an output to the controller that is proportional to difference in current between the first and second current sensors.

2. The system as recited in claim 1, further comprising a first current sensor connected in series in the first line between the first series pass element and the first output, wherein the first current sensor is operatively connected to the controller to provide feedback to the controller regarding current measured in the first line.

3. The system as recited in claim 1, further comprising a diode or-ing operatively connected to each of the first and second outputs and configured to output a single voltage from the first and second lines.

4. The system as recited in claim 3, wherein the diode or-ing includes a first Schottky diode connected to the first output and a second Schottky diode connected to the second output.

5. The system as recited in claim 1, wherein each of the first and second series pass elements includes a respective p-channel MOSFET as a primary pass element.

6. A system comprising:
a first input line for a first voltage source, wherein the first input line is connected to a first output;
a second input line for a second voltage source, wherein the second input line is connected to a second output and is in parallel with the first input line;
a first series pass element connected in series with the first input line;
a second series pass element connected in series with the second input line; and
a controller operatively connected to the first series pass element and to the second series pass element to throttle at least one of the first series pass element and the second series pass element to balance output current in the first and second outputs, further comprising a difference amplifier connected between the controller and the first series pass element for controlling the first series pass element.

7. The system as recited in claim 6, wherein the difference amplifier is connected to a bias voltage so the difference amplifier can compare between the output of the controller and the bias voltage to control the first series pass element.

8. A system comprising:
a first input line for a first voltage source, wherein the first input line is connected to a first output;
a second input line for a second voltage source, wherein the second input line is connected to a second output and is in parallel with the first input line;
a first series pass element connected in series with the first input line;
a second series pass element connected in series with the second input line; and a controller operatively connected to the first series pass element and to the second series pass element to throttle at least one of the first series pass element and the second series pass element to balance output current in the first and second outputs, further comprising a summing amplifier connected between the controller and the second series pass element for controlling the second series pass element.

9. The system as recited in claim 8, wherein the summing amplifier is connected to a bias voltage so the summing amplifier can compare between the output of the controller and the bias voltage to control the second series pass element.

10. A system comprising:
a first input line for a first voltage source, wherein the first input line is connected to a first output;
a second input line for a second voltage source, wherein the second input line is connected to a second output and is in parallel with the first input line;
a first series pass element connected in series with the first input line;
a second series pass element connected in series with the second input line; and
a controller operatively connected to the first series pass element and to the second series pass element to throttle at least one of the first series pass element and the second series pass element to balance output current in the first and second outputs, wherein the controller is a proportional integral (PI) controller.

11. A method comprising:
balancing an output current between a first input line and a second input line, wherein balancing output current includes throttling current in at least one of a first series pass element and second series pass element connected in series with the first input line and the second input line, respectively; and
receiving a sensed current from the first input line and a sensed current from the second input line with a difference amplifier.

12. The method as recited in claim 11, wherein balancing output current is performed within a response time configured to avoid tripping a breaker.

13. The method as recited in claim 11, further comprising maintaining the output current at 28 VDC.

14. A method comprising:
balancing an output current between a first input line and a second input line, wherein balancing output current includes throttling current in at least one of a first series pass element and second series pass element connected in series with the first input line and the second input line, respectively; and
receiving a sensed current from the first input line and a sensed current from the second input line with a difference amplifier,
wherein a controller operatively is connected to the first series pass element and to the second series pass element to throttle at least one of the first series pass element and the second series pass element to balance output current in the first and second outputs, a second current sensor is connected in series in the second line between the second series pass element and the second output, the second current sensor is operatively connected to the controller to provide feedback to the controller regarding current in the second line, and the difference amplifier is connected to receive input from each of the first and second current sensors, and connected to provide an output to the controller that is proportional to difference in current between the first and second current sensors.

15. A method comprising:

balancing an output current between a first input line and a second input line, wherein balancing output current includes throttling current in at least one of a first series pass element and second series pass element connected in series with the first input line and the second input line, respectively; and receiving a sensed current from the first input line and a sensed current from the second input line with a difference amplifier, wherein a controller operatively is connected to the first series pass element and to the second series pass element to throttle at least one of the first series pass element and the second series pass element to balance output current in the first and second outputs, and a summing amplifier is connected between the controller and the second series pass element for controlling the second series pass element.

16. A method comprising:

balancing an output current between a first input line and a second input line, wherein balancing output current includes throttling current in at least one of a first series pass element and second series pass element connected in series with the first input line and the second input line, respectively; and receiving a sensed current from the first input line and a sensed current from the second input line with a difference amplifier, wherein a controller operatively is connected to the first series pass element and to the second series pass element to throttle at least one of the first series pass element and the second series pass element to balance output current in the first and second outputs, a summing amplifier is connected between the controller and the second series pass element for controlling the second series pass element, and a second difference amplifier is connected to a bias voltage so the second difference amplifier can compare between the output of the controller and the bias voltage to control the first series pass element.

17. A method comprising:

balancing an output current between a first input line and a second input line, wherein balancing output current includes throttling current in at least one of a first series pass element and second series pass element connected in series with the first input line and the second input line, respectively; and receiving a sensed current from the first input line and a sensed current from the second input line with a difference amplifier, wherein a controller operatively is connected to the first series pass element and to the second series pass element to throttle at least one of the first series pass element and the second series pass element to balance output current in the first and second outputs, and a summing amplifier is connected between the controller and the second series pass element for controlling the second series pass element.

18. A method comprising:

balancing an output current between a first input line and a second input line, wherein balancing output current includes throttling current in at least one of a first series pass element and second series pass element connected in series with the first input line and the second input line, respectively; and receiving a sensed current from the first input line and a sensed current from the second input line with a difference amplifier, wherein a controller operatively is connected to the first series pass element and to the second series pass element to throttle at least one of the first series pass element and the second series pass element to balance output current in the first and second outputs, a summing amplifier is connected between the controller and the second series pass element for controlling the second series pass element, and the summing amplifier is connected to a bias voltage so the summing amplifier can compare between the output of the controller and the bias voltage to control the second series pass element.

19. A method comprising:

balancing an output current between a first input line and a second input line, wherein balancing output current includes throttling current in at least one of a first series pass element and second series pass element connected in series with the first input line and the second input line, respectively; and receiving a sensed current from the first input line and a sensed current from the second input line with a difference amplifier, wherein a controller operatively is connected to the first series pass element and to the second series pass element to throttle at least one of the first series pass element and the second series pass element to balance output current in the first and second outputs, wherein the controller is a proportional integral (PI) controller.

* * * * *